United States Patent [19]

Mukoyama

[11] 4,255,986
[45] Mar. 17, 1981

[54] DEVICE FOR ABSORBING IMPACT ENERGY

[75] Inventor: Makoto Mukoyama, Toyota, Japan

[73] Assignee: Toyota Jidosha Kogya Kabushiki Kaisha, Toyota, Japan

[21] Appl. No.: 933,520

[22] Filed: Aug. 14, 1978

[30] Foreign Application Priority Data

Aug. 15, 1977 [JP] Japan .......................... 52/109213[U]

[51] Int. Cl.³ .............................................. B62D 1/18
[52] U.S. Cl. ...................................... 74/492; 188/1 C
[58] Field of Search ................ 74/492, 493; 188/1 C; 180/208; 293/107, 108, 109, 110

[56] References Cited

U.S. PATENT DOCUMENTS

| 3,454,397 | 7/1969 | Yoshioka et al. ...................... 74/492 |
| 3,489,087 | 1/1970 | Soderberg ........................ 188/1 C X |
| 3,494,607 | 2/1970 | Rusch ............................. 188/1 C X |
| 3,530,737 | 9/1970 | Higginbotham ....................... 74/492 |
| 3,699,824 | 10/1972 | Staudenmayer ....................... 74/492 |
| 3,797,873 | 3/1974 | Cook ............................. 188/1 C X |
| 4,019,403 | 4/1977 | Kondo et al. ....................... 74/492 |

Primary Examiner—Werner H. Schroeder
Assistant Examiner—Andrew M. Falik
Attorney, Agent, or Firm—Koda and Androlia

[57] ABSTRACT

A device for absorbing impact energy including a shaft assembly which includes a tubular member and a rod like member coupled to the tubular member such that the shaft assembly can contract, at least one orifice provided in the shaft assembly and connecting the interior of the tubular member with the exterior of the tubular member, an energy absorbing material provided in the interior of the tubular member and a receiving chamber provided on the shaft assembly adjacent the reduction whereby when impact energy is applied to the shaft assembly, the impact absorbing material flows through the orifice and is contained in the receiving chamber.

5 Claims, 8 Drawing Figures

DEVICE FOR ABSORBING IMPACT ENERGY

BACKGROUND OF THE INVENTION

1. Field of the Invention

This invention relates to impact energy absorbing devices and more particularly to impact energy absorbing devices which absorb impact load in an axial direction and which are utilized in motor vehicles.

2. Prior Art

In recent years, guaranteeing the safety of automobile passengers in collision has become a more serious problem as the cruising speed of automobiles has increased. In such motor vehicles, the drivers are particularly liable to receive serious injury in an automobile collision as a result of being propelled forward by inertia and striking the steering wheel with great force. Accordingly, steering wheel mechanisms have been designed in which the steering wheel shaft, to which the steering wheel is attached, and the steering wheel shaft post, which supports the steering wheel shaft so that the shaft is free to rotate and can contract in an axial direction and thereby absorb impact energy.

A conventional impact absorbing steering mechanism of the type described above is illustrated in FIGS. 1 and 2. In the Figures, the impact absorbing steering mechanism includes a steering wheel 10, steering gear box 12, a two-part steering shaft 14 consisting of a rod-shaped upper shaft 16 and a tubular lower shaft 18 which is coaxially coupled with the upper shaft 16 such that the two-part assembly can contract, shear pins 20 which connect the upper shaft 16 with the lower tube 18 and which are cut by a specified shearing force, a bracket 22 which connects the lower end of the steering shaft 14 with the gear of the steering gear box 12, impact energy absorbing silicone rubber 24 which is stored in the internal space 26 in the lower tube 18, a plug 28 that is pushed through an orifice 30 formed in the bracket 22, the steering gear box 12 is provided on a engine or fire wall 32 which separates the engine compartment 34 from the interior vehicle space 36.

In impact absorbing steering mechanisms of this type, the movement of the upper shaft 16 relative to the lower tube 18 is prevented by the shear pins 20 when the force applied to the steering shaft 14 in the axial direction is smaller than the shearing force required to cut the shearing pins 20. Accordingly, the silicone rubber 24 is maintained in a static condition and the steering torque applied to the steering wheel 10 is transmitted to the steering gear box 12 so that normal steering action takes place. On the other hand, when an abnormal impact is applied in an axial direction to the upper shaft 16 and the lower tube 18 due to the driver's chest striking the steering wheel 10 because of a vehicle collision, etc., the shear pins 20 are cut and the lower end of the upper shaft 16 moves into the silicone rubber 24 inside the internal space 26 in the lower tube 18 as shown in FIG. 3. As a result, the silicone rubber 24 is compressed by the intruding upper shaft 16 and is destroyed so that it begins to flow. The impact energy is absorbed by the elasticity and resistance to destruction and flow of the silicone rubber 24. Furthermore, when the compression of the silicone rubber 24 reaches a specified value, the plug 28 is knocked out and the silicone rubber from this point on is gradually discharged via the orifice 30 into the engine compartment 34 so that the impact energy is absorbed smoothly and with only a slight shock.

Such a conventional impact absorbing steering mechanism in which the impact energy is absorbed by an energy absorbing material which is discharged via an orifice to the outside of the device at the time of impact, offers the special features of being made of a few parts and a simple structure than devices which use steel balls, etc., to absorb the impact energy. However, since in such conventional devices the energy absorbing material discharged via the orifice is discharged to the outside of the impact energy absorbing device, such devices suffer from the drawback in that they create a danger of vehicular fires during accidents. Particularly, when a combustible substance such as silicone rubber is used as the energy absorbing material, the danger of vehicular fire is increased when the energy absorbing material is discharged in the engine compartment. Specifically, silicone rubber burns at 550° C. and ignites spontaneously at temperature exceeding 600° C. Since the exhaust system inside the engine compartment is normally heated to temperatures exceeding 600° C., there is danger that the silicone rubber will ignite spontaneously if it comes into contact with the surface of the exhaust manifold. Furthermore, for cases where the energy absorbing material is discharged into the vehicle interior instead of the engine compartment, there is still a danger of fire due to electrical sparks, etc.

SUMMARY OF THE INVENTION

Accordingly it is a general object of the present invention to provide a device for absorbing impact energy in which the impact energy absorbing material is not discharged to the outside of the impact energy absorbing device at the time the impact energy is absorbed.

It is another object of the present invention to provide a device for absorbing impact energy which does not increase the danger of vehicular fire during the time when impact energy is absorbed.

In keeping with the principles of the present invention, the objects are accomplished by a unique device for absorbing impact energy. The device for absorbing impact energy includes a shaft assembly which includes a tubular member and rod-like member coupled to the tubular member such that the shaft assembly can contract, at least one orifice provided in the shaft assembly and connecting the interior of the tubular member with the exterior of the tubular member, an energy absorbing material provided in the tubular member and the receiving chamber provided on the shaft assembly adjacent the orifice whereby when impact energy is applied to the shaft assembly, the impact absorbing material flows through the orifice as contained in the receiving chamber.

BRIEF DESCRIPTION OF THE DRAWINGS

The above mentioned features and objects of the present invention will become more apparent with reference to the following description taken in conjunction with the accompanying drawings, wherein like reference numerals denote like elements, and in which.

DETAILED DESCRIPTION OF THE INVENTION

Figure 1:
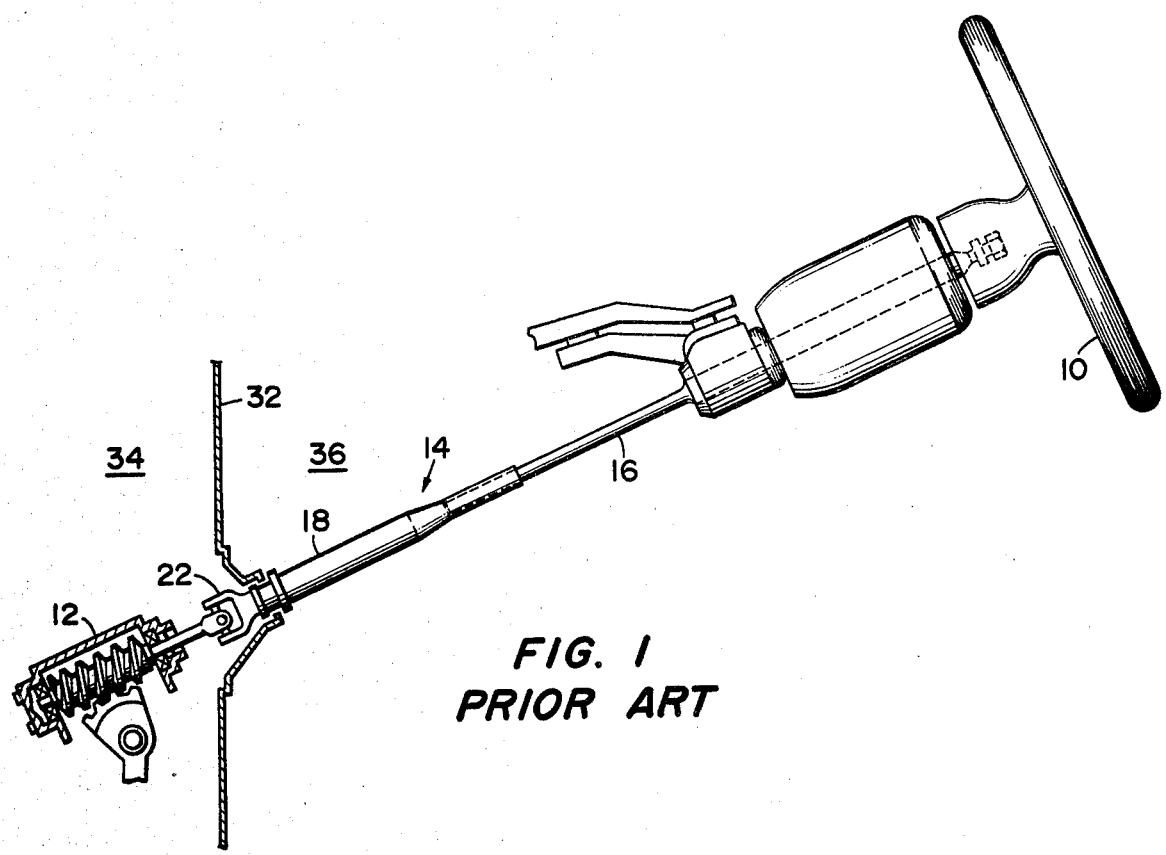
FIG. 1 is a side view including a partial cross-section which illustrates a prior art impact absorbing automobiles steering mechanism.
Figure 2:
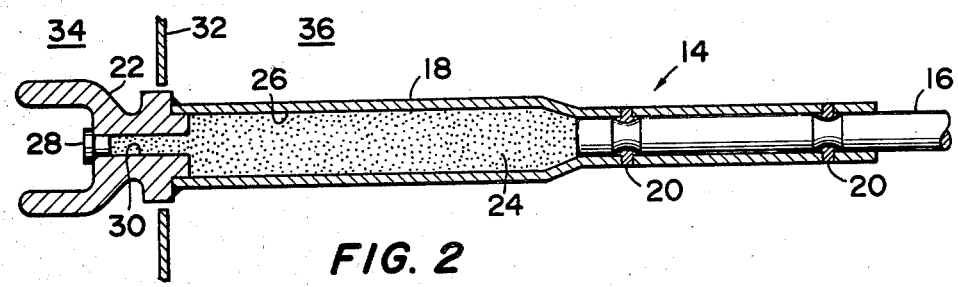
FIG. 2 is a longitudinal section which illustrates the structure of the steering shaft of the impact absorbing steering mechanism of FIG. 1.
Figure 3:
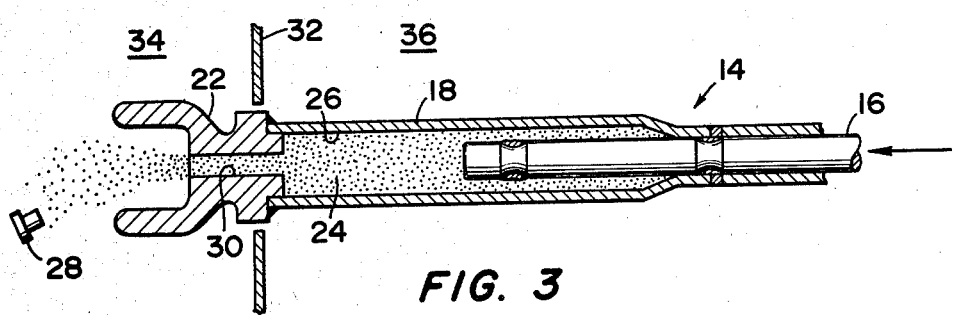
FIG. 3 is a longitudinal section which illustrates the impact absorbing action of the impact absorbing steering mechanism in FIG. 2.
Figure 4:
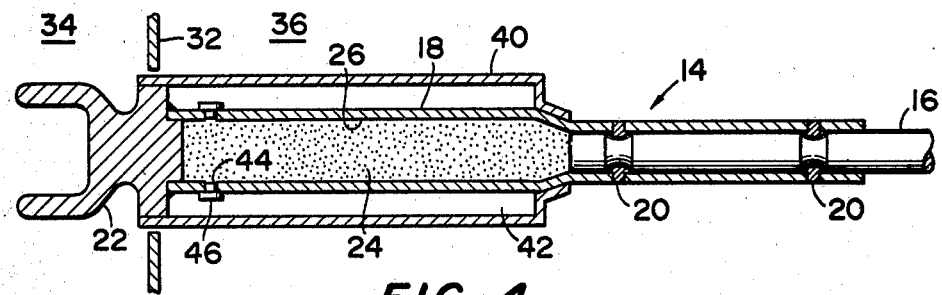
FIG. 4 is one embodiment of an impact absorbing automobile steering mechanism in accordance with the teachings of the present invention.

Referring to FIG. 4, shown therein is a first embodiment of a device for absorbing impact energy in accordance with the teachings of the present invention. This first embodiment is similar to the prior art device except that a roughly cylindrical outer jacket 40 is installed around the outside of the lower tube 18 such that it is substantially coaxial with the lower tube 18 and forms an enclosed space 42. The outer jacket 40 is installed at one end by rigidly fastening it to the periphery of bracket 22 and at the other end by rigidly fastening it to the circumference of the lower tube 18. Orifices 44 are drilled in the walls of the lower tube 18 so that the interior space 26 in the lower tube 18 communicates with the enclosed space 42. Thus, the orifice in the bracket 22 is omitted since it is unnecessary. Plugs 46 are pushed into the orifices 44 and are arranged and configured such that they will be knocked out by a specific amount of force.

Figure 5:
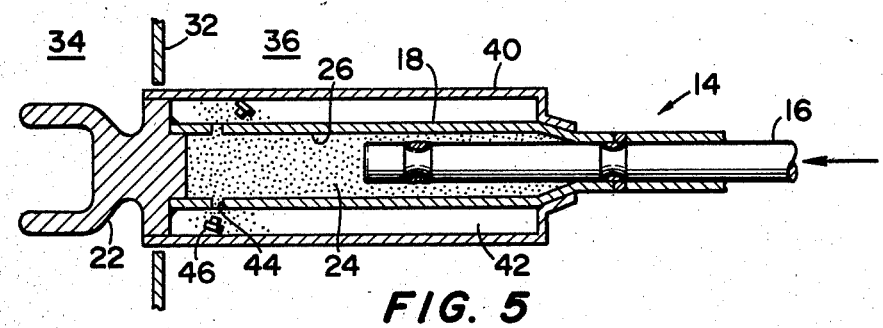
FIG. 5 is a longitudinal section which illustrates the impact absorbing action of the embodiment of FIG. 4.

In operation, when an abnormal impact force is applied to the steering shaft 14 in an axial direction due to a vehicular collision, etc., the shear pins 20 are cut and the lower end of the shaft 16 moves into the silicone rubber 24 inside the internal space 26 in the lower tube 18, as shown in FIG. 5. As a result, the silicone rubber 24 is compressed by the intruding upper shaft 16 and is destroyed. When this compression exceeds a given value, the plugs 46 pushed into orifices 44 are knocked out. As a result, the silicone rubber 24 is discharged from the internal space 26 so that the impact energy is absorbed. All of the silicone rubber 24 discharged from the internal space 26 is accommodated inside the enclosed space 42 and none of it is discharged into the engine compartment 34 or vehicular interior 36.

Since in this embodiment the outer jacket 40 is designed to rigidly fastened to both the lower tube 18 and the bracket 22, this device can be easily manufactured. Furthermore, since the orifices 44 are formed near the lower end of the internal space 26 in the lower tube 18, it is easy to obtain impact energy absorbing characteristics which are almost identical to those of conventional impact absorbing steering mechanisms.

Figure 6:
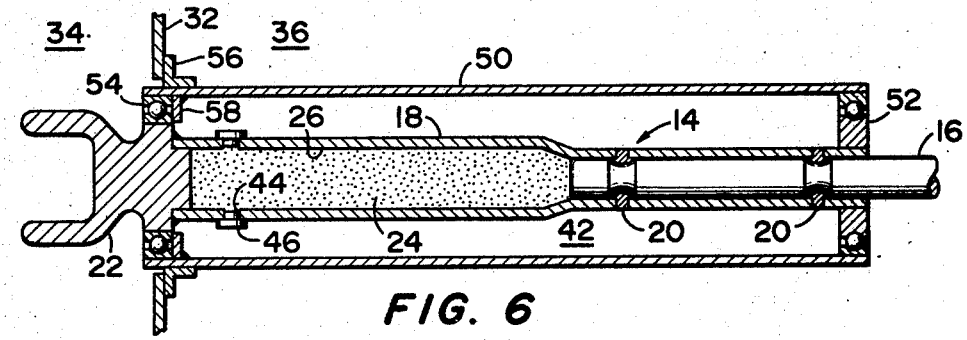
FIG. 6 is a longitudinal section which illustrates a second embodiment of an impact absorbing device in accordance with the teachings of the present invention.

Referring to FIG. 6, shown therein is a second embodiment of an impact absorbing device in accordance with the present invention. This second embodiment is similar to the first embodiment except that the roughly cylindrical outer jacket 50 is supported by means of bearings 52 and 54 such that it is free to rotate relative to the lower tube 18 and the bracket 22. The outer jacket 50 is secured to the engine or fire wall 32 by brackets 56. A ring-like bearing cover 58 is provided which prevents the silicone rubber 24 from flowing to the lower bearing 54 into the engine compartment 34.

In operation, when an abnormal impact energy is applied to the steering shaft 14, the shear pins 20 are cut and the lower end of the upper shaft 16 moves into the silicone rubber 24 inside the internal space 26 in the lower tube 18. As a result, the silicone rubber 24 is compressed by the intruding upper shaft 16 and is destroyed. When this compression exceeds a given value, the plugs 46 pushed into the orifices 44 are knocked out. As a result, the silicone rubber 24 is discharged from the internal space 26 and into the enclosed space 42 and none of it is discharged into the engine compartment 34 or vehicular interior 36.

Since in this second embodiment the outer jacket 50 does not rotate during normal steering operation, the rotating parts of the steering shaft 14 are not exposed to the vehicular interior 36. Accordingly, even if the passenger's body or clothing should come into contact with steering column, there is no danger that anything will strike the rotating parts of the steering column and be wound around the steering shaft. Furthermore, since the rotating parts are not visible from the vehicular interior, the device is also superior in terms of aesthetic design. Furthermore, since in this device a bearing cover is installed on the lower bearing 54, the device is very safe but this bearing cover could be omitted if the proper type of energy absorbing material is utilized.

Figure 7:
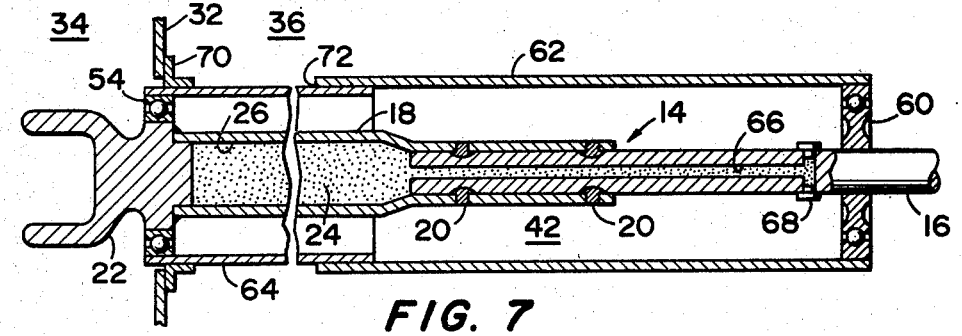
FIG. 7 is a longitudinal section illustrating a third embodiment of an impact absorbing device in accordance with the teachings of the present invention.

Referring to FIG. 7, shown therein is a third embodiment of impact absorbing device in accordance with the teachings of the present invention. This third embodiment is similar to the first and second embodiments except that the cover which covers the steering shaft 14 consists of a roughly cylindrical first outer jacket 62 which is supported by means of a bearing 60 so that it is free to rotate relative to the upper shaft 16 and is installed so that it is coaxial with the upper shaft 16 and the roughly cylindrical second outer jacket 64 which engages at one end with the lower end of the first outer jacket 62 so that it is free to slide in a longitudinal direction relative to the lower end and is supported at its other end by means of bearing 54 so that it is free to rotate relative to the bracket 22 and is coaxial with the lower tube 18. An orifice 66, which connects the internal space 26 in the lower tube 18 with the enclosed space 42 formed by the cover, is drilled through the approximate center of the upper shaft 16. Plugs 68 are pushed into the outlets of the orifice 66 in the upper shaft 16 and are arranged to figure such that they will be knocked out by a specified amount of force. The second outer jaceket 64 is supported from the engine or fire wall 32 by brackets 70.

The coupling 72 between the first outer jacket 62 and the second outer jacket 64 is designed such that the cover can contract in the direction of the axis of the steering shaft 14. In this coupling 72, both the first and second outer jackets are free to rotate relative to each other. Thus, it is possible to allow the first outer jacket 62 to rotate along with the steering shaft 14 or to prevent rotation of the first outer jacket 62 by securing it to some other part of the vehicle body or to prevent rotation of the first outer jacket 62 by installing some type of rotation preventing mechanism in the coupling 72.

Figure 8:
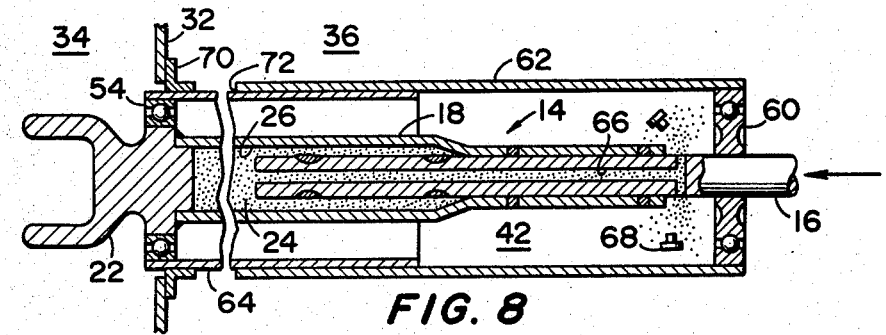
FIG. 8 is a longitudinal section which illustrates the impact absorbing action of the embodiment of FIG. 7.

In operation, when an abnormal impact force is applied to the steering shaft 14 in an axial direction due to a vehicular collision, etc., the shear pins 20 are cut and the lower end of the upper shaft 16 moves into the silicone rubber 24 inside the internal space 26 in the lower tube 18 as shown in FIG. 8. As a result, the silicone rubber 24 is compressed by the intruding upper shaft 16 and is destroyed. When the compression exceeds a given value, the plugs 68 are pushed out of the orifice 66. As a result, the silicone rubber 24 is discharged from the internal space 26 so that the impact energy is absorbed. Since the silicone rubber 24 discharged from the internal space 26 is accommodated in the enclosed space 42 there is no discharge of silicone rubber into the vehicle interior 36 or the engine compartment 34. Since in this embodiment the orifice 66 is drilled in the approximate center of the upper shaft 16, such orifice 66 is lengthened and the flow resistance of the silicone rubber 24 can be increased. Furthermore, since in this embodiment the silicone rubber 24 is discharged into the enclosed space 42 from points near the upper end of the lower tube 18, there is little likelihood that the silicone rubber 24 will penetrate into the engine compartment 34 through the bearing area even if a bearing cover similar to the one in the second embodiment is not provided. In addition, since in this embodiment the rotating parts of the steering shaft 14 are not exposed to the vehicle interior 36, the device is very safe and is superior in terms of aesthetic design as well.

It should be apparent that while in this embodiment the cover which formed the enclosed space 42 consisted of two outer jackets 62 and 64 which were each engaged with the other at one end and which can slide relative to each other in a longitudinal direction, other structures which allow the cover to contract in the direction of the axis of the steering shaft could be utilized. For example, it is possible to make the cover contractible by forming pleats in an intermediate portion of the outer jacket. Furthermore, it would be possible to use some other energy absorbing material other than silicone rubber. Depending upon the impact energy absorbing characteristics required, the energy absorbing material could be a fluid metals such as lead, plastics and plastic synthetics such as cellulose, acetate, butyrate, ethylcellulose, etc., or a rubber such as silicone rubber, butyl rubber or some other elastomer, etc. In addition, while plugs are shown inserted into the orifices, it would be possible to omit the plugs if the normal fluidity of the energy absorbing material is low. Also, the cover need not be cylindrical and some other shape such as a square or a triangle cross section could be utilized for the cover. Furthermore, the impact absorbing device of the present invention while described in terms of an automobile steering mechanism could also be utilized as energy absorbing device to support impact absorbing bumpers for motor vehicles.

It should be apparent to one skilled in the art that the above described embodiment is merely illustrative of but a few of the many possible specific embodiments which represents the application of the principles of the present invention. Numerous and varied other arrangements can be readily devised by those skilled in the art without departing from the spirit and scope of the invention.

I claim:

1. A device for absorbing impact energy comprising:
   a shaft assembly which comprises a tubular member and rod-like member coupled to the tubular member such that the shaft assembly can contract;
   at least one outer jacket made of hard material provided around the outside of said shaft assembly;
   an energy absorbing material made of silicone rubber provided in the interior of said tubular member: and
   at least one orifice provided in said tubular member which connects the interior of said outer jacket only with the interior of said tubular member whereby an impact energy is applied to said shaft assembly, the impact absorbing material is compressed and flows through the orifice and is contained in a receiving chamber formed between said outer jacket and shaft assembly, and the impact energy is absorbed.

2. A device for absorbing impact energy comprising:
   a shaft assembly which comprises a tubular member and a rod-like member coupled to the tubular member such that the shaft assembly can contract;
   at least one outer jacket made of hard material provided around the outside of said rod-like member;
   an energy absorbing material provided in the interior of said tubular member; and
   at least one passage drilled through the approximate center of said rod-like member which connects the interior of said outer jacket only with the interior of said tubular member whereby an impact energy is applied to said shaft assembly, said energy absorbing material is compressed and flows through said at least one passageway and is contained in a receiving chamber formed between said outer jacket and shaft assembly, and the impact energy is absorbed.

3. A device for absorbing impact energy according to claim 2 wherein said receiving chamber is substantially cylindrical in shape.

4. A device for absorbing impact energy according to claim 2 wherein bearings are provided between said shaft assembly and said outer jacket such that said outer jacket is free to rotate relative to said shaft assembly.

5. A device for absorbing energy according to claim 2 wherein said outer jacket comprises first outer jacket and second outer jacket which engages at one end with one end of said first outer jacket slideably such that said outer jacket can contract in the direction of the axis of said shaft assembly.

* * * * *